US005546069A

United States Patent [19]

Holden et al.

[11] Patent Number: 5,546,069

[45] Date of Patent: Aug. 13, 1996

[54] TAUT ARMATURE RESONANT IMPULSE TRANSDUCER

[75] Inventors: Irving H. Holden, Boca Raton; Charles W. Mooney, Lake Worth; Gerald E. Brinkley, West Palm Beach; John M. McKee, Hillsboro Beach, all of Fla.

[73] Assignee: Motorola, Inc., Schaumburg, Ill.

[21] Appl. No.: 341,242

[22] Filed: Nov. 17, 1994

[51] Int. Cl.[6] .............................. H04B 3/36; G08B 5/22

[52] U.S. Cl. .............................. 340/407.1; 340/311.1; 340/825.46; 340/388.5; 340/393.1; 381/150; 381/192; 310/29; 310/81

[58] Field of Search .............................. 340/407.1, 384.73, 340/388.3, 388.4, 388.5, 388.6, 391.1, 393.1, 398.1, 392.5, 397.1, 397.3, 396.1, 825.46, 825.44, 311.1; 381/192, 193, 202, 205, 199, 150; 310/21, 22, 29, 32, 33

[56] References Cited

U.S. PATENT DOCUMENTS

| | | | |
|---|---|---|---|
| 5,107,540 | 4/1992 | Mooney et al. | 381/192 |
| 5,163,093 | 11/1992 | Frielingsdorf | 381/151 |
| 5,172,092 | 12/1992 | Nguyen et al. | 340/311.1 |
| 5,323,468 | 6/1994 | Bottesch | 381/151 |
| 5,327,120 | 7/1994 | McKee et al. | 340/825.46 |

*Primary Examiner*—Donnie L. Crosland
*Attorney, Agent, or Firm*—Philip P. Macnak

[57] ABSTRACT

An taut armature, resonant impulse transducer (100) includes an armature (12), including an upper (14) and a lower (16) non-linear resonant suspension member, each including at least two juxtaposed planar compound beams (202, 204 and 206, 208) connected symmetrically about a contiguous planar central region (210), and further connected to two contiguous planar perimeter regions (212, 214), an electromagnetic driver (24, 26), coupled to the upper and lower non-linear resonant suspension members (14, 16) about the two contiguous planar perimeter regions (212, 214), the electromagnetic driver (24, 26) effecting an alternating electromagnetic field in response to an input signal, and a magnetic motional mass (18) suspended between the upper and lower non-linear resonant suspension members(14, 16) about the contiguous planar central region (210), and coupled to the alternating electromagnetic field for generating an alternating movement of the magnetic motional mass (18) in response thereto, the alternating movement of the magnetic motional mass (18) being transformed through the upper and lower non-linear resonant suspension members (14, 16) and the electromagnetic driver (24, 26) into motional energy.

30 Claims, 5 Drawing Sheets

100

TAUT ARMATURE RESONANT IMPULSE TRANSDUCER

BACKGROUND OF THE INVENTION

1. Field of the Invention:

This invention relates in general to electromagnetic transducers, and more specifically to a taut armature resonant electromagnetic transducer.

2. Description of the Prior Art:

Portable communication devices, such as pagers, have generally used cylindrical motors which spin an eccentric counterweight or "pancake" motors which utilize eccentric armature weighting to generate a tactile, or "vibratory" alert. Such an alert is desirable to generate a "silent" alert which is used to alert the user that a message has been received without disrupting persons located nearby. While such devices have worked satisfactorily for many years and are still widely being used, several issues limit a much broader use. Motors, when used to provide a tactile, "silent", alert are hardly "silent", but rather provide a perceptible acoustic output due in part to the high rotational frequency required for the operation of the motor to spin the counterweight sufficiently to provide a perceptible tactile stimulation. Likewise, such motors, as a result of their inherent design, have generally consumed a substantial amount of energy for operation. This has meant that the motor must be switched directly from the battery for operation, and significantly impacts the battery life that can be expected during normal operation of the portable communication devices.

Recently, a new generation of non-rotational, radial electromagnetic transducers was described by Mooney et al., U.S. Pat. No. 5,107,540, and McKee et al., U.S. Pat. No. 5,327,120, which significantly reduced the energy consumed from a battery for operation as a tactile alerting device. In addition, since the electromagnetic transducer operated at a sub-audible frequency which maximized the tactile sensation developed when the transducer is coupled to a person, a truly silent non-disruptive alert was provided. Because the size and shape of the radial electromagnetic transducer was similar to that of a pancake motor, retrofits of the new device could readily be more accommodated in established communication devices with little change to the driving circuitry or mechanics.

While the new generation of non-rotational, radial electromagnetic transducers have significantly reduced the energy consumption, and have also significantly reduced the sound developed when in actual operation, there is yet a need for an electromagnetic transducer which provides an even lower energy consumption, while maintaining the performance characteristics of the radial electromagnetic transducers.

SUMMARY OF THE INVENTION

In accordance with one aspect of the present invention, a taut armature, resonant impulse transducer comprises an armature, an electromagnetic driver and a magnetic motional mass. The armature includes upper and lower non-linear resonant suspension members, each comprising a pair of juxtaposed planar compound beams connected symmetrically about a contiguous planar central region, and further connected to a pair of contiguous planar perimeter regions. The electromagnetic driver is coupled to the upper and lower non-linear resonant suspension members about the pair of contiguous planar perimeter regions. The electromagnetic driver effects an alternating electromagnetic field in response to an input signal. The magnetic motional mass is suspended between the upper and lower non-linear resonant suspension members about the contiguous planar central region, and coupled to the alternating electromagnetic field for generating an alternating movement of the magnetic motional mass in response to the input signal. The alternating movement of the magnetic motional mass is transformed through the upper and lower non-linear resonant suspension members and the electromagnetic driver into motional energy.

In accordance with another aspect of the present invention, an inertial audio delivery device comprises a taut armature resonant inertial transducer and a housing. The taut armature, resonant inertial transducer comprises an armature, an electromagnetic driver and a magnetic motional mass. The armature includes upper and lower nonlinear resonant suspension members, each comprising a pair of juxtaposed planar compound beams connected symmetrically about a contiguous planar central region, and further connected to a pair of contiguous planar perimeter regions. The electromagnetic driver is coupled to the upper and lower non-linear resonant suspension members about the pair of contiguous planar perimeter regions. The electromagnetic driver effects an alternating electromagnetic field in response to an input signal. The magnetic motional mass is suspended between the upper and lower non-linear resonant suspension members about the contiguous planar central region, and coupled to the alternating electromagnetic field for generating an alternating movement of the magnetic motional mass in response to the input signal. The alternating movement of the magnetic motional mass is transformed through the upper and lower non-linear resonant suspension members and the electromagnetic driver into motional energy. The housing encloses the taut armature resonant inertial transducer, and delivers the acoustic energy.

DESCRIPTION OF THE PREFERRED EMBODIMENTS

Figure 1:
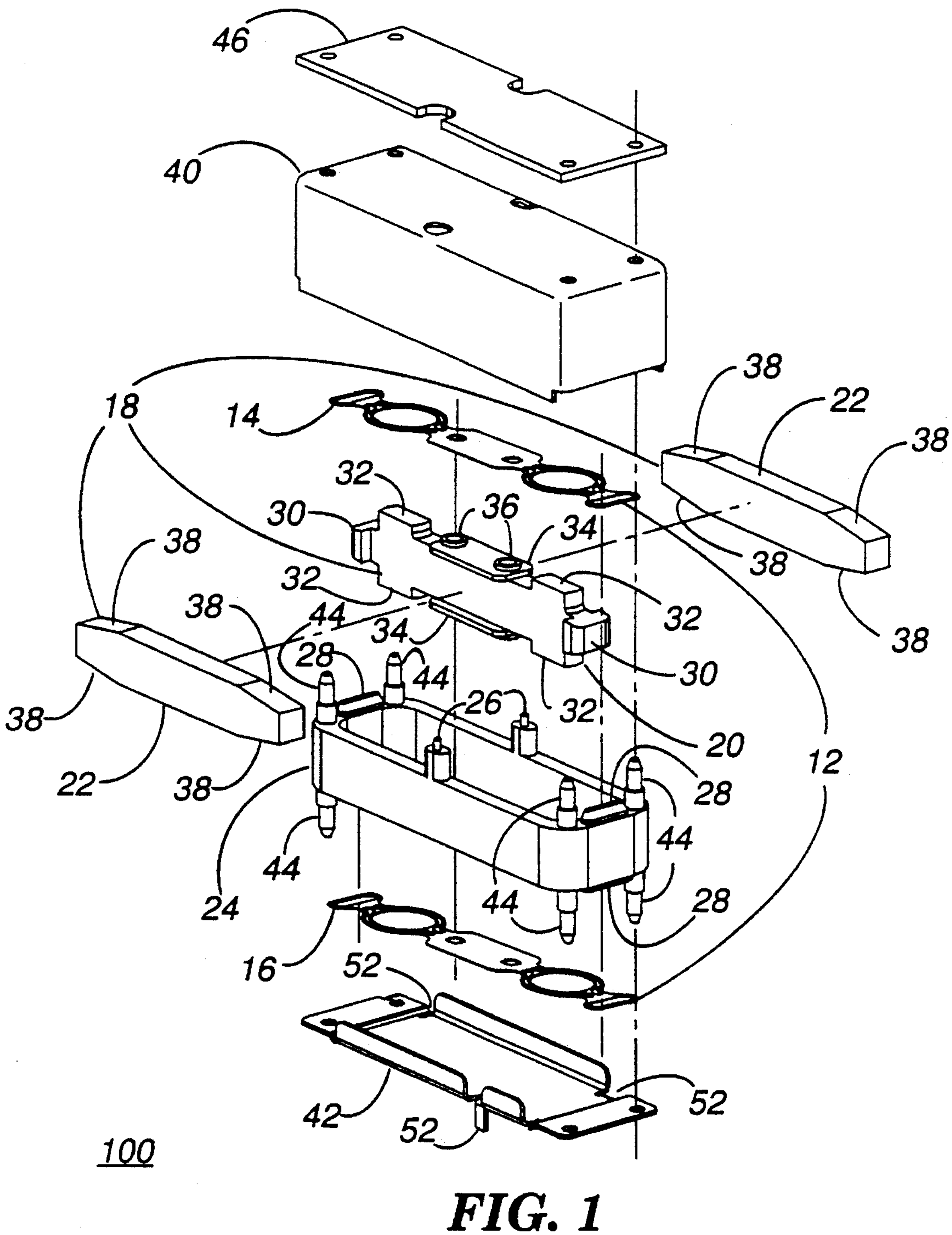
FIG. 1 is an exploded view of a taut armature resonant impulse transducer in accordance with the preferred embodiment of the present invention.

FIG. 1 is an exploded view of a taut armature resonant impulse transducer 100 in accordance with the preferred embodiment of the present invention. The taut armature resonant impulse transducer 100 comprises an armature 12 including an upper non-linear resonant suspension member 14 and a lower non-linear resonant suspension member 16, a support frame 24 including a coil 26, and a magnetic motional mass 18 including a magnet mount 20 and two permanent magnets 22, The support frame 24 and the coil 26 in combination are referred to as an electromagnetic driver.

Figure 2:
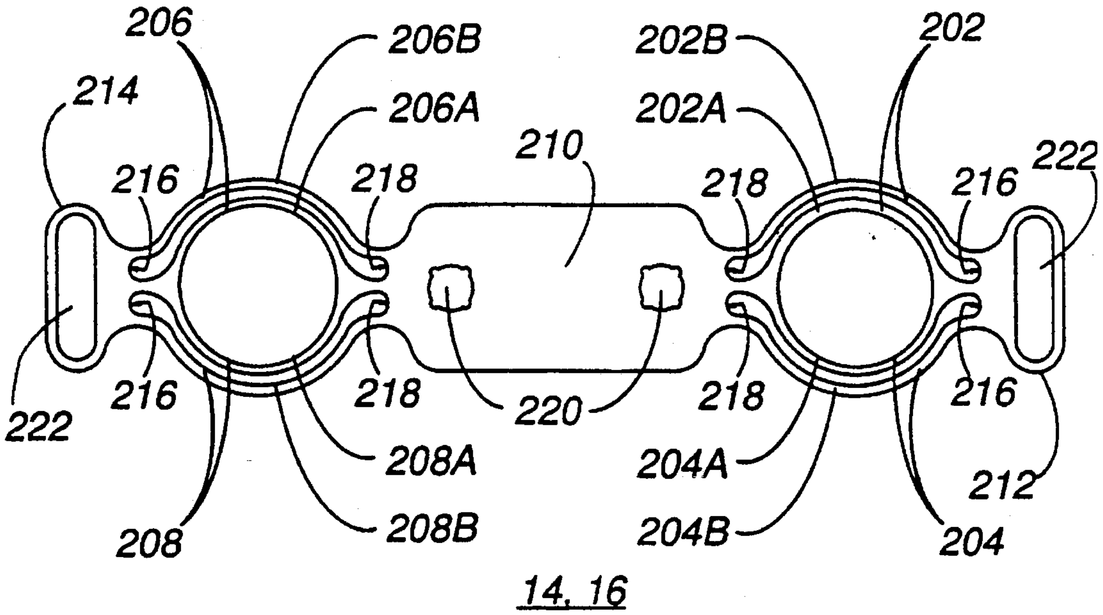
FIGS. 2 and 3 are top elevational views of a non-linear resonant suspension member utilized in the taut armature resonant impulse transducer of FIG. 1.

Referring to FIG. 2 which is a top elevational view of the non-linear resonant suspension member utilized in the taut armature resonant impulse transducer 100 of FIG. 1, the non-linear resonant suspension members 14, 16 comprise a pair of juxtaposed planar compound beams 202, 204 and 206, 208 which are connected symmetrically about a contiguous planar central region 210. The juxtaposed planar compound beams 202, 204 and 206, 208 are also connected respectively to a corresponding one of a pair of contiguous planar perimeter regions 212, 214. Each of the juxtaposed planar compound beams 202 and 204, and 206 and 208 comprise respectively two independent concentric arcuate beams, inner beams 202A, 204A, 206A and 208A, and outer beams 202B, 204B, 206B and 208B, each having the same, or substantially constant, spring rates (K). The substantially constant spring rates are achieved by reducing the width of the inner beam relative to the width of the outer beam over a functional beam length 1, which is shown in FIG. 3.

Figure 3:
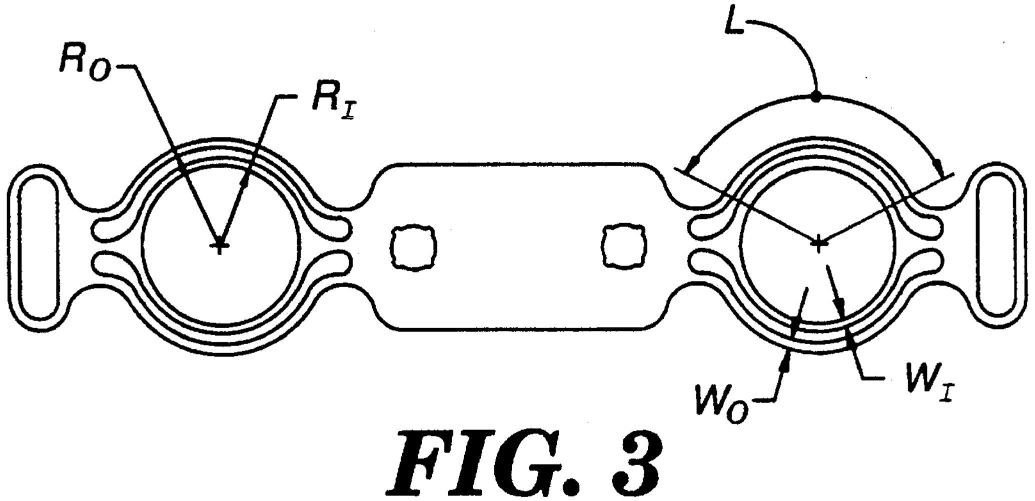

Referring to FIG. 3, the functional beam length 1 is defined as that beam length over which the width of the inner beams 202A, 204A, 206A and 208A, and outer beams 202B, 204B, 206B and 208B remain of uniform, or substantially constant width. The beam width is referenced to the medial inner beam width, $W_i$ and the medial outer beam width, $W_o$, although it will be appreciated that since the beam width is substantially constant over the functional beam length 1, the beam width could be measured relative to any point along the functional beam length 1. The spring rates of the inner arcuate beams and the outer arcuate beams are rendered essential the same by adjusting the beam widths, wherein the medial outer beam width, $W_o$ is greater than the medial inner beam width, $W_i$. The inner arcuate beams 202A, 204A, 206A and 208A and the outer arcuate beams 202B, 204B, 206B and 208B have preferably a circular shape as shown in FIG. 3. The inner arcuate beams 202A, 204A, 206A and 208A have a first mean radius, or dimension, $R_i$ and the outer arcuate beams 202B, 204B, 206B and 208B have a second mean radius, or dimension, $R_o$. While the inner and outer arcuate beams are described as having preferably a circular shape, it will be appreciated that an oval or ellipsoidal shape can be utilized as well, wherein the dimension, or locus of points of the inner arcuate beams 202A, 204A, 206A and 208A is less than the outer arcuate beams 202B, 204B. Also while the juxtaposed planar compound beams 202, 204, 206 and 208 are shown as being formed from two independent concentric arcuate beams, it will be appreciated that additional concentric arcuate beams can be provided to increase the spring force of each juxtaposed planar compound beam 202, 204 and 206, 208.

Returning to FIG. 2, the juxtaposed planar compound beams 202, 204 and 206, 208 are connected to the planar central region 210 and to the planar perimeter regions 212, 214 by filleted regions, or fillets 216 and 218 which have a radius which is greater than the medial width of the outer beams 202B, 204B, 206B or 208B. The fillets 216, 218 significantly reduce the stress generated at the connection of the juxtaposed planar compound beams 202, 204 and 206, 208 to the planar central region 210 and to the planar perimeter region 212, 214. By way of example, for an armature 12 having a resonant frequency of 90 Hz, the inner arcuate beams 202A, 204A, 206A and 208A have a medial width of 0.004 inches (0.10 mm) whereas the outer arcuate beams 202B, 204B, 206B or 208B have a medial width of 0.005 inches (0.13 mm). The fillet 216, 218 radius is 0.010 inches (0.25 mm).

The planar central region 210 includes two mounting holes 220 which are utilized to fasten a magnetic motional mass 18, to be described below, to the upper non-linear suspension member 14 and a lower nonlinear suspension member 16. The planar perimeter regions 212, 214 also include mounting holes 222 which are used to fasten the upper nonlinear suspension member 14 and a lower non-linear suspension member 16 to a support frame 24. The non-linear spring members 14, 16 are preferably formed from a sheet metal, such as 0.0040 inch (0.10 mm) thick Sandvik™7C27Mo2 Stainless Steel produced by Sandvik Steel Company, Sandviken, Sweden, which is preferably formed using a chemical milling or etching process, although it will be appreciated that other part forming processes can be utilized as well.

Returning to FIG. 1, the support frame 24 encloses a coil 26 (not shown although identified by the coil termination) which forms an electromagnetic driver (24, 26) which is used to effect an alternating electromagnetic field as will be described further below. By way of example, the coil 26 comprises two hundred and twenty-seven (227) turns of No. 44 gauge enamel coated copper wire which terminates in coil termination 26, and which presents a one hundred (100) ohm resistance. The electromagnetic driver 16 is preferably manufactured using an injection molding process wherein the coil 26 is molded into the support frame 24. By way of example, a 30% glass-filled liquid crystal polymer is used to form the support frame 24, although it will be appreciated that other injection moldable thermoplastic materials can be utilized as well. The upper non-linear suspension member 14 and the lower non-linear suspension member 16 are attached to the support frame 24 by four bosses 28, only three of which are visible, as will be described below.

The magnetic motional mass 18 comprises a magnet support 20 and two permanent magnets 22. The magnet support 20 is preferably manufactured using a die casting process and is preferably cast from a die casting material such as Zamak 3 zinc die-cast alloy. It will be appreciated that the magnetic motional mass can also be manufactured using other casting processes, such as an investment casting process, using casting materials such as tungsten which increase significantly the mass to volume ratio of the magnet support 20, such as would be required to achieve significantly lower frequency operation, as will be described below. The magnet support 20 is shaped to provide end restraints 30 and top to bottom restraints 34 which are used to locate the permanent magnets 22 during assembly to the magnet support 20. The magnet support 20 further includes piers 32 which maximize the mass to volume ratio of the magnet support 20 and which fit within the opening of the juxtaposed planar compound beams 202, 204 and 206, 208. The thickness of the magnet support 20 is reduced at the end restraints 30 to maximize the excursion of the magnetic motional mass 18 during operation, as will be described further below. Four flanges 36, (two of which are shown) are used to secure the upper non-linear resonant suspension member 14 and a lower non-linear resonant suspension member 16 to the magnet support 20, as will be described below.

Figure 4:
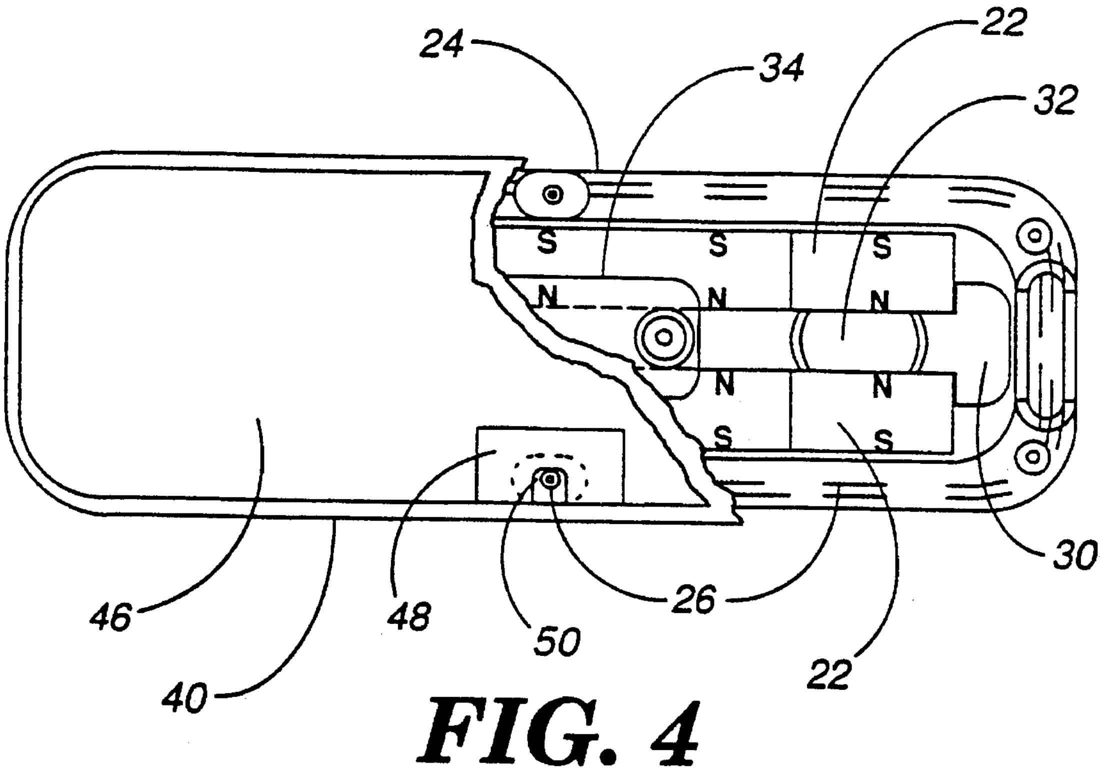
FIG. 4 is a partially sectioned top elevational view of the taut armature resonant impulse transducer of FIG. 1.

As shown in FIG. 4, the permanent magnets 22 are assembled to the magnet support 20 with like poles (north/ north or south/south) oriented together. The permanent magnets 22 are assembled to the magnet support 20 using an adhesive bonding material, such as provided by a thermoset beta-stage epoxy preform which is cured using heat and pressure while positioning the permanent magnets 22. The two permanent magnets 22 are preferably formed from a Samarium Cobalt material having a 25 MGOe minimum magnetic flux density, although it will be appreciated that other high flux density magnetic materials can be utilized as well. The ends 38 of the permanent magnets 22 are tapered to maximize the excursion of the magnetic motional mass 18 during operation.

The design of the taut armature resonant impulse transducer 100 provides for Z-axis assembly techniques such as utilized in an automated robotic assembly process, or line. The assembly process will be briefly described below. After the permanent magnets 22 have been assembled, as described above, to the magnet support 20, the upper non-linear resonant suspension member 14 is positioned onto two flanges 36 of the magnet support 20, which are then staked, such as by using an orbital riveting process to secure the upper non-linear resonant suspension member 14 to the magnet support 20. The magnetic motional mass 18 is next placed into the cavity shown in FIG. 1. within the support frame 24, and is positioned relative to the support frame 24 by the openings 222 within the planar perimeter regions 212, 214 of the upper non-linear resonant suspension member 14. The upper non-linear resonant suspension member 14 is then secured to the support frame 24 by deforming the bosses 28 using a staking process, such as heat or ultrasonic staking. The support frame 28 is then turned over, and the lower non-linear resonant suspension member 16 is positioned over the flanges 36 and the bosses 28. The bosses 28 are then deformed as described above, after which the flanges are staked, also as described above, thus completing the assembly of the magnetic motional mass 18 to the support frame 24 and the armature 12.

The taut armature resonant impulse transducer 100 which has been assembled as described above, can be utilized as is, i.e. without a housing, or with a housing to enclose the taut armature resonant impulse transducer 100 can be provided. The housing, when utilized, preferably comprises an upper housing section 40 and a lower housing section, or base plate 42. The upper housing section 40 is preferably formed using "316" stainless steel using a suitable forming process such as a sheet metal drawing and forming process. The base plate 42 is also preferably formed using "316" stainless steel using a suitable forming process such as a sheet metal stamping process. It will be appreciated that other non-magnetic materials can be utilized as well to form the upper housing section 40 and the base plate 42.

When the housing is included, the base plate 42 is positioned over the four lower posts 44 (opposite coil 26 termination) which are then deformed using a staking process, such as a heat or ultrasonic staking to secure the base plate 42 to the support frame 24. The upper housing section 40 is next positioned over the opposite four posts 44, after which a printed circuit board 46 is preferably positioned, and the four posts 44 are then deformed using the staking process, as described above, to secure the upper housing section 40 and a circuit board 46 to the support frame 24. The printed circuit board 46, is preferably formed from a suitable printed circuit board material, such as a G10 glass epoxy board, or FR4 glass epoxy board, and is used to provide termination pads 48 for the coil 26 termination, as shown in FIG. 4, which is a partial section view of the taut armature resonant impulse transducer 100 with the upper non-linear resonant suspension member 14 removed. The termination pads 48 are provided by copper cladding on the printed circuit board 46 which has been selectively etched to define the pad area. The coil 26 terminations are electrically coupled to the termination pads 48 using a soldering technique, or other suitable connecting processes such as a welding process can be utilized as well. Three mounting tabs 52, shown in FIG. 1, are provided on the base plate 42 to mechanically fasten the completely assembled taut armature resonant impulse transducer 100 to a supporting substrate, such as a printed circuit board, as will be described below.

Figure 5:
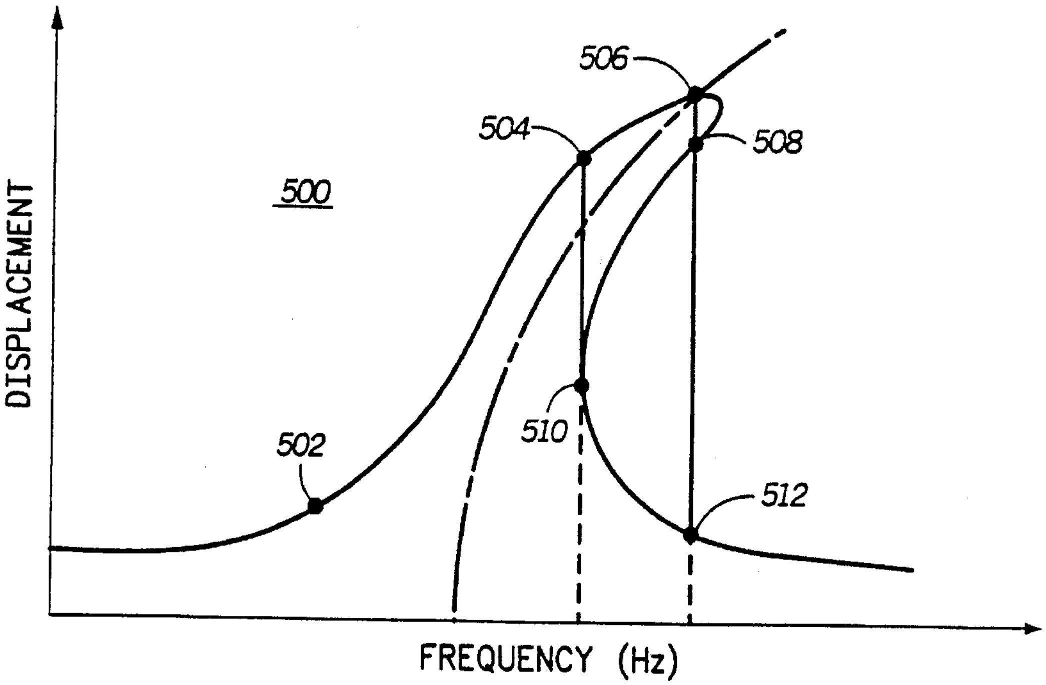
FIG. 5 is a graph depicting the impulse output as a function of frequency for taut armature resonant impulse transducer of FIG. 1, utilizing a hardening spring type resonant system.

Referring to FIG. 5 which is a graph depicting the impulse output response as a function of input frequency for the taut armature resonant impulse transducer 100, which utilizes a hardening non-linear resonant spring system. The taut armature resonant impulse transducer 100 is preferably driven by a swept driving frequency, operating between a first driving frequency to provide a lower impulse output 502 and a second driving frequency to provide an upper impulse output 504. The upper impulse output 504 is preferably selected to correspond substantially to the maximum driving frequency at which there is only a single stable operating state. As can be seen from FIG. 5, two stable operating states 504 and 510 are possible when the driving frequency is set to that required to obtain impulse output 510, and as the driving frequency is increased, three stable operating states can exist, such as shown by example as impulse outputs 506, 508 and 512. It will be appreciated, that only those impulse responses which lie on the curve 500 between operating states 502 and 504 are desirable when utilizing the taut armature resonant impulse transducer 100 as a tactile alerting device because the impulse output is reliably maximized over that frequency range, which is at and somewhat below the resonant frequency of the taut armature resonant impulse transducer 100.

The taut armature resonant impulse transducer 100, as described by example above, provides a coil resistance of 100 ohms, which when driven for example with an excitation voltage of 1.0 volt requires only a 10 milli-ampere supply current, and which when driven at discrete input frequencies produces a peak displacement related to the driving frequency as described above. By way of example, a peak displacement of 0.035 inches (0.89 mm) is achieved at a discrete center driving frequency of 85 Hz which corresponds to an impulse output of 27 g's, calculated from the following formula:

$$g's=0.10235\ (d)(f)^3$$

where g is the impulse output generated by the system, d is the displacement of the vibrating mass, and f is the driving frequency.

When the taut armature resonant impulse transducer 100, as described above, is driven by either a discrete frequency input signal or a swept frequency input signal, the electromagnetic driver 26 effects an alternating electromagnetic field which is coupled to magnetic motional mass 18. The upper and lower non-linear suspension members 14, 16 provide a restoring force which is normal to the movement of the magnetic motional mass 18, and as a consequence, the alternating magnetic field in turn produces the alternating movement of the magnetic motional mass 18 which is then transformed by the non-linear resonant suspension members 14, 16 and the support frame 24 which encloses the electromagnetic driver 26 into tactile energy which can be externally coupled, such as to a person.

While the description provided above described driving the taut armature resonant impulse transducer 100 with a discrete frequency input signal or a swept frequency input signal so as to generate tactile energy, the taut armature resonant impulse transducer 100 can also be driven by an audio signal so as generate low level tactile energy thereby providing an inertial output which will be described further below. When driven by an audio signal, those impulse responses which lie on the curve 500 above the operating state 512 are suitable for providing low level tactile and audible responses. In addition, the response to audio input frequencies above the operating state 512 are enhanced by the harmonic responses of the taut armature resonant impulse transducer 100, the operation of which can now be described as a taut armature resonant inertial transducer.

Figure 6:
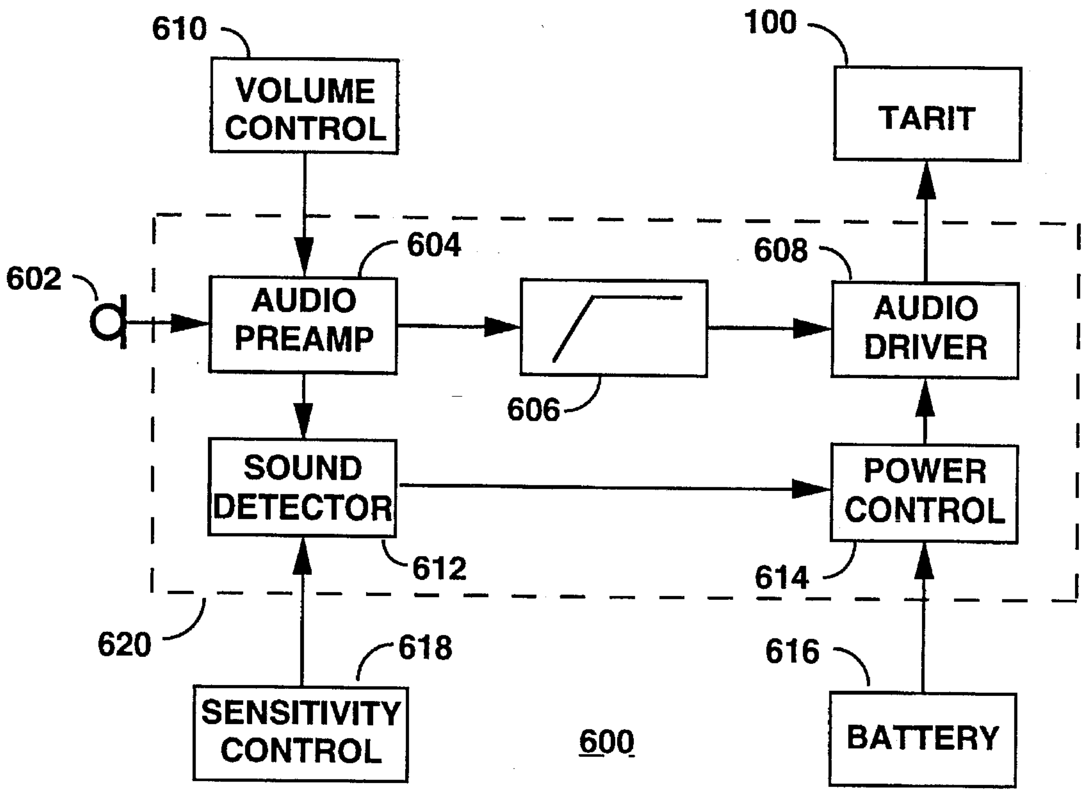
FIG. 6 is an electrical block diagram of an inertial audio delivery device in accordance with the preferred embodiment of the present invention.

FIG. 6 is an electrical block diagram of an inertial audio delivery device 600 utilizing the taut armature resonant impulse transducer 100 described above. The inertial audio delivery device 600 comprises an acoustic pickup, or microphone 602 which receives audible signals, such a speech and noise, and generates an electrical signal at the acoustic pickup output which is representative of the speech and noise. The electrical signals are coupled to the input of an audio preamplifier 604 which amplifies the electrical signals. A volume control 610 couples to the audio preamplifier 604 and is used to control the preamplifier gain, thereby controlling the electrical signal amplification. The amplified electrical signal is coupled to a high pass filter 606 which passes those electrical signals which are above the resonant frequency of the taut armature resonant impulse transducer 100, so as to preclude generating a high level tactile response by the taut armature resonant impulse transducer 100 as described above. The filtered electrical signal is then coupled to an audio driver 608 which further amplifies the signal to a level sufficient to drive the taut armature resonant impulse transducer 100. Since the signal that are finally amplified are above the resonant frequency of the taut armature resonant impulse transducer 100, the device produces only low level tactile energy, and can therefor be described as a taut armature resonant inertial transducer 100. The inertial audio delivery device 600 is especially suited for such applications as a mastoid hearing aid, to be described in further detail below. It will be appreciated from the description to follow that the inertial audio delivery device 600 can be utilized for a wide variety of other applications as well.

When the inertial audio delivery device 600 is utilized for an application such as a mastoid hearing aid, the energy consumption from a battery 616 is extremely critical, especially in view of the relatively low energy capacities available using conventional button cell batteries, such as mercury, zinc-air and lithium button cell batteries. A portion of the electrical signal which is amplified by the preamplifier 604 is coupled to the input of a sound detector 612 which samples the received speech and noise signals, and when the speech and noise signals exceed a predetermined threshold, a power control signal is generated which is coupled to the power control circuit 614 which then couples power from the battery 616 to the audio driver 608. A sensitivity control 618 is used adjust the level of the predetermined threshold at which power is supplied to the audio driver 608. This enables the user to control the level at which the inertial audio delivery device 600 is operational, and reduces power consumption from the battery 616, when the sound level is too to generate intelligible tactile energy. It will be appreciated that most elements of the audio preamp circuit 604, the high pass filter circuit 606, the audio driver circuit 608, the sound detector circuit 612 and the power control circuit 614 can be integrated into a single audio detector/amplifier integrated circuit 620, thereby reducing the number of discrete components which are needed to assemble the device.

Figure 7:
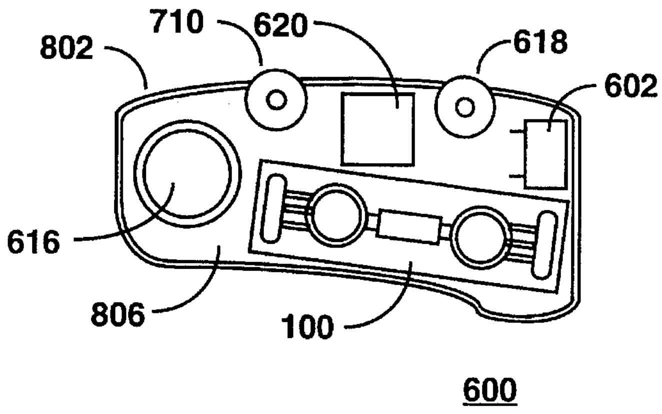
FIG. 7 is an elevational view showing an interior view of the inertial audio delivery device of FIG. 6.
Figure 8:
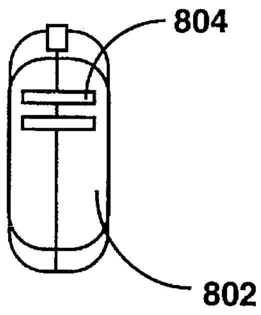
FIG. 8 is a right side elevational view of the inertial audio delivery device of FIG. 6.

FIG. 7 is an elevational view showing an interior view of an inertial audio delivery device 600 utilizing the taut armature resonant inertial transducer 100. As shown, the inertial audio delivery device comprises a housing 802 into which is located a printed circuit board 806, or other suitable component mounting medium. Attached to the printed circuit board 806 are the acoustic pickup device 602, the taut armature resonant inertial transducer 100, the detector amplifier integrated circuit 620, the volume control 610, the sensitivity control 618 and the battery 616, along with any other discrete components which may be required. As shown in FIG. 8, a sound port 804 is provided to couple the acoustic energy into the acoustic pickup device 602. The inertial audio delivery device 600, as described above can be utilized as, for example, a mastoid hearing aid. Sound which exceeds a predetermined threshold set by the hearing aid wearer, is converted into tactile and low level acoustic energy which can be coupled to the mastoid process of the hearing aid wearer, thereby enabling a person who is essentially tone deaf to hear via the conduction of acoustic energy into the mastoid process and consequently into the inner ear.

Figure 9:
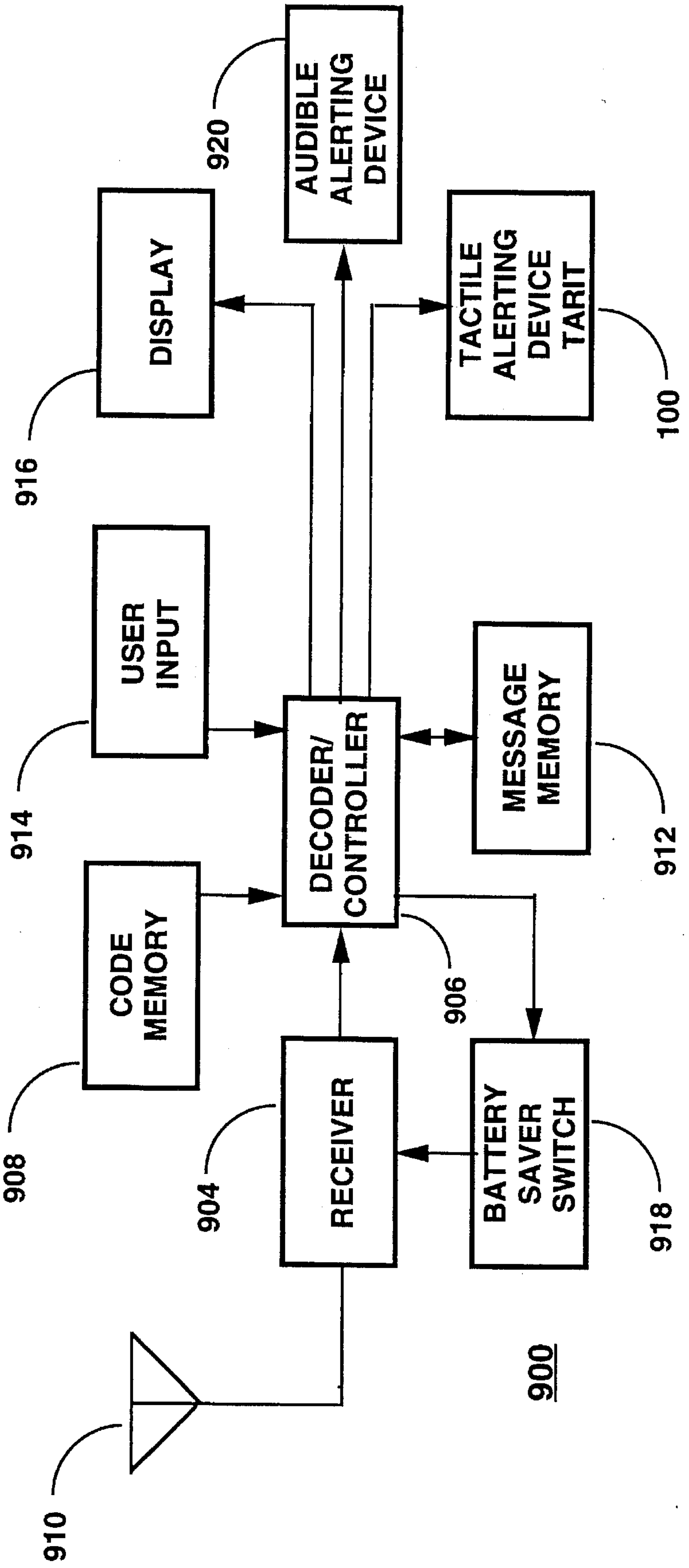
FIG. 9 is an electrical block diagram of a communication device utilizing the taut armature resonant impulse transducer in accordance with the preferred embodiment of the present invention.

FIG. 9 is an electrical block diagram of a portable communication device which utilizes the taut armature resonant impulse transducer 100 in accordance with the preferred embodiment of the present invention. Under the control of the decoder/controller 906, the battery saver switch 918 is periodically energized, supplying power to the receiver 904. When power is supplied to the receiver 904, transmitted coded message signals which are intercepted by an antenna 910 are coupled to the input of the receiver 904 which then receives and processes the intercepted signals in a manner well known to one of ordinary skill in the art. In practice, the intercepted coded message signals include address signals identifying the portable communication device to which message signals are intended. The received address signals are coupled to the input of a decoder/controller 906 which compares the received address signals with a predetermined address which is stored within the code memory 908. When the received address signals match the predetermined address stored, the message signals are received, and the message is stored in a message memory 912. The decoder/controller also generates an alert enable signal which is coupled to an audible alerting device 920, such as a piezoelectric or electromagnetic transducer, to generate an audible alert indicating that a message has been received. Likewise the alert enable signal can be coupled to a tactile alerting device, such as the taut armature resonant impulse transducer 100, to generate tactile energy, as described above, which provides a tactile alert indicating that the message has been received. The audible or tactile alert can be reset by the portable communication device user, and the message can be recalled from the message memory 912 via controls 914 which provide a variety of user input functions. The message recalled from the message memory 912 is directed via the decoder/controller 906 to a display 916, such as an LCD display, where the message is displayed for review by the portable communication device user.

In summary a taut armature resonant impulse transducer 100 has been described above which can efficiently convert either discrete frequency or swept frequency electrical input signals which are generated at/or near the resonant frequency of the taut armature resonant impulse transducer 100 into high level tactile energy. The generation of tactile energy is accomplished at a very low current drain as compared to conventional motor driven tactile alerting devices. When the taut armature resonant impulse transducer 100 is operated at frequencies above the resonant frequency of the taut armature resonant impulse transducer 100, the taut armature resonant impulse transducer 100 can be described as a taut armature resonant inertial transducer 100 which efficiently converts sound energy into low level tactile energy such as required to deliver audio signals in an inertial audio delivery device such as described above.

We claim:

1. A taut armature, resonant impulse transducer, comprising:

an armature, including upper and lower non-linear resonant suspension members, each comprising a pair of juxtaposed planar compound beams connected symmetrically about a contiguous planar central region, and further connected to a pair of contiguous planar perimeter regions;

an electromagnetic driver, coupled to said upper and lower non-linear resonant suspension members about said pair of contiguous planar perimeter regions, said electromagnetic driver for effecting an alternating electromagnetic field in response to an input signal; and a magnetic motional mass suspended between said upper and lower non-linear resonant suspension members about said contiguous planar central region, and coupled to said alternating electromagnetic field for generating an alternating movement of said magnetic motional mass in response thereto, the alternating movement of said magnetic motional mass being transformed through said upper and lower non-linear resonant suspension members and said electromagnetic driver into motional energy.

2. The taut armature, resonant impulse transducer according to claim 1, wherein said upper and lower non-linear resonant suspension members provide a restoring force which is normal to the alternating movement of said magnetic motional mass.

3. The taut armature, resonant impulse transducer according to claim 1, wherein said pair of juxtaposed planar compound beams each comprise at least two independent concentric arcuate beams.

4. The taut armature, resonant impulse transducer according to claim 3, wherein said at least two independent concentric arcuate beams exhibits a substantially identical spring rate (K).

5. The taut armature, resonant impulse transducer according to claim 4, wherein said at least two independent concentric arcuate beams comprise an inner arcuate beam having a first mean dimension, and at least an outer arcuate beam having a second mean dimension, wherein said second mean dimension is greater than said first mean dimension.

6. The taut armature, resonant impulse transducer according to claim 5, wherein said inner arcuate beam and said at least an outer arcuate beam have a circular shape.

7. The taut armature, resonant impulse transducer according to claim 5, wherein said inner arcuate beam has a first medial beam width, and wherein said at least an outer arcuate beam has a second medial beam width, wherein said second medial beam width is greater than said first medial beam width.

8. The taut armature, resonant impulse transducer according to claim 7, wherein said inner arcuate beam and said at least an outer arcuate beam have a functional beam length, and wherein the first medial beam width and said second medial beam width are uniform over said functional beam length.

9. The taut armature, resonant impulse transducer according to claim 7, wherein said inner arcuate beam and said at least an outer arcuate beam are merged into said contiguous planar central region and into said contiguous planar perimeter regions with a fillet having a radius substantially greater than said second medial beam width.

10. The taut armature, resonant impulse transducer according to claim 1, wherein said magnetic motional mass comprises:

first and second permanent magnets, each generating a permanent magnetic field having a predetermined N-S magnetic field orientation; and a magnet mount for mounting said first and second permanent magnets such that said predetermined N-S magnetic field orientation of each of said first and second permanent magnets are in opposition.

11. The taut armature, resonant impulse transducer according to claim 10, wherein each of said pair of juxtaposed planar compound beams provides an aperture bound by said pair of juxtaposed planar compound beams, and wherein said magnet mount includes shaped channels formed therein that enable portions of said magnet mount to pass freely through said aperture, thereby increasing the alternating movement of said magnetic motional mass relative to said upper and lower non-linear resonant suspension members.

12. The taut armature, resonant impulse transducer according to claim 1, wherein said input signal is a subaudible frequency electrical signal, and wherein the alternating movement of said magnetic motional mass is transformed through said upper and lower non-linear resonant suspension members and said electromagnetic driver into tactile energy.

13. The taut armature, resonant impulse transducer according to claim 1 further comprising a housing for enclosing and to provide mounting for said armature, said electromagnetic driver and said magnetic motional mass.

14. An inertial audio delivery device, comprising:

a taut armature resonant inertial transducer, comprising an armature, including upper and lower non-linear resonant suspension members, each comprising a pair of juxtaposed planar compound beams connected symmetrically about a contiguous planar central region, and further connected to a pair of contiguous planar perimeter regions, an electromagnetic driver, coupled to said upper and lower non-linear resonant suspension members about said pair of contiguous planar perimeter regions, said electromagnetic driver for effecting an alternating electromagnetic field in response to an input signal, and a magnetic motional mass suspended between said upper and lower non-linear resonant suspension members about said contiguous planar central region, and coupled to said alternating electromagnetic field for generating an alternating movement of said magnetic motional mass in response thereto, the alternating movement of said magnetic motional mass being transformed through said upper and lower non-linear resonant suspension members and said electromagnetic driver into acoustic energy; and a housing, for enclosing said taut armature resonant inertial transducer, and for delivering the acoustic energy.

15. The inertial audio delivery device according to claim 14, wherein said upper and lower non-linear resonant suspension members provide a restoring force which is normal to the alternating movement of said magnetic motional mass.

16. The inertial audio delivery device according to claim 14, wherein said pair of juxtaposed planar compound beams comprises at least two independent concentric arcuate beams.

17. The inertial audio delivery device according to claim 16, wherein each of said at least two independent concentric arcuate beams exhibits a substantially identical spring rate (K).

18. The inertial audio delivery device according to claim 17, wherein said at least two independent concentric arcuate beams comprise an inner arcuate beam having a first mean dimension, and at least an outer arcuate beam having a second mean dimension, wherein said second mean dimension is greater than said first mean dimension.

19. The inertial audio delivery device according to claim 18, wherein said inner arcuate beam and said at least an outer arcuate beam have a circular shape.

20. The inertial audio delivery device according to claim 18, wherein said inner arcuate beam has a first medial beam width, and wherein said at least an outer arcuate beam has a second medial beam width, wherein said second medial beam width is greater than said first medial beam width.

21. The inertial audio delivery device according to claim 20, wherein said inner arcuate beam and said at least an outer arcuate beam have a functional beam length, and wherein the first medial beam width and said second medial beam width are uniform over said functional beam length.

22. The inertial audio delivery device according to claim 20, wherein said inner arcuate beam and said at least an outer arcuate beam are merged into said contiguous planar central region and into said contiguous planar perimeter regions with a fillet having a radius substantially greater than said second medial beam width.

23. The inertial audio delivery device according to claim 14, wherein said magnetic motional mass comprises:

first and second permanent magnets for generating a permanent magnetic field having a predetermined N-S magnetic field orientation; and a magnet mount for mounting said first and second permanent magnets such that said predetermined N-S magnetic field orientation of each said first and second permanent magnets are in opposition.

24. The inertial audio delivery device according to claim 23, wherein each of said pair of juxtaposed planar compound beams provides an aperture bound by said pair of juxtaposed planar compound beams, and wherein said magnet mount includes shaped channels formed therein that enable portions of said magnet mount to pass freely through said aperture, thereby increasing the alternating movement of said magnetic motional mass relative to said upper and lower non-linear resonant suspension members.

25. The inertial audio delivery device according to claim 14, wherein said housing provides physical contact with a mastoid process of a person, and wherein said inertial audio delivery device further comprises:

a microphone for receiving sound signals and for converting the sound signals into analog signals; and an amplifier having a predetermined amplification, for amplifying the analog signals to generate an amplified analog signal which is coupled to said electromagnetic driver to provide the input signal, whereby the acoustic energy is delivered by said housing to the mastoid process.

26. The inertial audio delivery device according to claim 25, further comprising a first control, coupled to said amplifier, for controlling the predetermined amplification of said amplifier.

27. The inertial audio delivery device according to claim 25, further comprises a high pass filter for selectively filtering sub audible frequencies present within the sound signals.

28. The inertial audio delivery device according to claim 25, further comprising:

a sound detector circuit for detecting a presence of sound signals, and for generating a power control signal in response thereto; and a power control circuit, responsive to the power control signal, for supplying energy from a battery to said amplifier when the power control signal is generated.

29. The inertial audio delivery device according to claim 28, wherein said power control circuit has a predetermined threshold level at which the power control signal is generated, and said inertial audio delivery device further comprises a second control, coupled to said sound detector circuit, for controlling the predetermined threshold level at which the power control signal is generated.

30. A communication device, comprising:

a receiver for receiving and demodulating coded message signals including at least an address signal, and for deriving therefrom a demodulated address signal;

a decoder, coupled to said receiver, for decoding the demodulated address signal, and for generating an alert signal in response to the demodulated address signal matching a predetermined address; and a taut armature resonant inertial transducer, responsive to the alert signal being generated, said taut armature resonant inertial transducer comprising an armature, including upper and lower non-linear resonant suspension members, each comprising a pair of juxtaposed planar compound beams connected symmetrically about a contiguous planar central region, and further connected to a pair of contiguous planar perimeter regions, an electromagnetic driver, coupled to said upper and lower non-linear resonant suspension members about said pair of contiguous planar perimeter regions, said electromagnetic driver for effecting an alternating electromagnetic field in response to the alert signal being generated, and a magnetic motional mass suspended between said upper and lower non-linear resonant suspension members about said contiguous planar central region, and coupled to said alternating electromagnetic field for generating an alternating movement of said magnetic motional mass in response thereto, the alternating movement of said magnetic motional mass being transformed through said upper and lower non-linear resonant suspension members and said electromagnetic driver into tactile energy, whereby the tactile energy generated provides a tactile alert alerting reception of the coded message signals.

* * * * *